United States Patent
Cheng et al.

(10) Patent No.: US 10,664,229 B2
(45) Date of Patent: May 26, 2020

(54) SEARCH-BASED DYNAMIC VOICE ACTIVATION (71) Applicant: Google Technology Holdings LLC, Mountain View, CA (US)

(72) Inventors: Yan Ming Cheng, Inverness, IL (US); Changxue Ma, Barrington, IL (US); Theodore Mazurkiewicz, Lake Zurich, IL (US)

(73) Assignee: Google LLC, Mountain View, CA (US)

( * ) Notice: Subject to any disclaimer, the term of this patent is extended or adjusted under 35 U.S.C. 154(b) by 1075 days.

(21) Appl. No.: 14/464,016

(22) Filed: Aug. 20, 2014

(65) Prior Publication Data

US 2014/0358903 A1   Dec. 4, 2014

Related U.S. Application Data (63) Continuation of application No. 12/126,077, filed on May 23, 2008, now abandoned.

(60) Provisional application No. 61/018,112, filed on Dec. 31, 2007.

(51) Int. Cl.

| | | |
|---|---|---|
| *G06F 3/0481* | (2013.01) | |
| *G06F 3/16* | (2006.01) | |
| *G06K 9/00* | (2006.01) | |
| *G09B 5/04* | (2006.01) | |
| *G10L 19/00* | (2013.01) | |
| *G06F 16/245* | (2019.01) | |
| *G06F 3/038* | (2013.01) | |
| *G06F 40/40* | (2020.01) | |
| *G06F 3/0484* | (2013.01) | |
| *G10L 15/22* | (2006.01) | |

(52) U.S. Cl.
CPC .............. *G06F 3/167* (2013.01); *G06F 3/038* (2013.01); *G06F 3/0481* (2013.01); *G06F 3/04817* (2013.01); *G06F 3/04842* (2013.01); *G06F 16/245* (2019.01); *G06F 40/40* (2020.01); *G06K 9/00* (2013.01); *G09B 5/04* (2013.01); *G10L 19/0018* (2013.01); *G06F 3/16* (2013.01); *G10L 2015/228* (2013.01)

(58) Field of Classification Search
CPC ....... G10L 19/0018; G10L 15/18; G09B 5/04; G09B 21/00; G06F 3/0481; G06F 16/332; G06F 16/245; G06F 3/167; G06F 3/038; G06F 3/0484; G06K 9/00; H04M 3/2281
See application file for complete search history.

(56) References Cited

U.S. PATENT DOCUMENTS

| | | | |
|---|---|---|---|
| 5,878,421 A * | 3/1999 | Ferrel | ............... G06F 17/212 |
| 5,884,266 A | 3/1999 | Dvorak | |
| 6,101,510 A * | 8/2000 | Stone | ............... G06F 17/30873 |
| | | | 715/234 |

(Continued)

*Primary Examiner* — Steven P Sax (74) *Attorney, Agent, or Firm* — Honigman LLP; Brett A. Krueger (57) ABSTRACT

A method, apparatus, and electronic device for voice navigation are disclosed. A voice input mechanism 310 may receive a verbal input from a user to a voice user interface program invisible to the user. A processor 104 may identify in a graphical user interface (GUI) a set of GUI items. The processor 104 may convert the set of GUI items to a set of voice searchable indices 400. The processor 104 may correlate a matching GUI item of the set of GUI items to a phonemic representation of the verbal input.

15 Claims, 7 Drawing Sheets

(56) References Cited

U.S. PATENT DOCUMENTS

| | | | | |
|---|---|---|---|---|
| 6,230,173 B1 * | 5/2001 | Ferrel | | G06F 17/218 715/205 |
| 6,357,010 B1 * | 3/2002 | Viets | | G06F 21/6218 709/225 |
| 6,667,751 B1 * | 12/2003 | Wynn | | G06F 17/30876 707/E17.112 |
| 7,020,841 B2 | 3/2006 | Dantzig et al. | | |
| 7,412,726 B1 * | 8/2008 | Viswanath | | H04L 63/0272 713/166 |
| 8,702,504 B1 * | 4/2014 | Hughes | | G06F 3/04842 463/29 |
| 2001/0013001 A1 * | 8/2001 | Brown | | H04M 3/493 704/270.1 |
| 2002/0065109 A1 * | 5/2002 | Mansikkanienni | | H04L 67/36 455/566 |
| 2003/0046082 A1 * | 3/2003 | Siegel | | G06F 17/30017 704/270 |
| 2004/0006478 A1 | 1/2004 | Alpdemir et al. | | |
| 2004/0102973 A1 | 5/2004 | Lott | | |
| 2004/0215456 A1 | 10/2004 | Taylor | | |
| 2005/0027531 A1 * | 2/2005 | Gleason | | G10L 13/06 704/260 |
| 2006/0217990 A1 * | 9/2006 | Theimer | | G06F 17/30038 707/769 |
| 2007/0061132 A1 | 3/2007 | Bodin et al. | | |
| 2007/0071206 A1 * | 3/2007 | Gainsboro | | H04M 3/2281 379/168 |
| 2007/0198267 A1 * | 8/2007 | Jones | | G06F 16/332 704/257 |
| 2007/0288240 A1 * | 12/2007 | Huang | | G10L 13/033 704/260 |
| 2008/0005127 A1 | 1/2008 | Schneider | | |
| 2008/0040332 A1 * | 2/2008 | Lee | | H04H 60/66 |
| 2009/0013255 A1 | 1/2009 | Yuschik et al. | | |
| 2009/0106228 A1 | 4/2009 | Weinman, Jr. | | |
| 2009/0119587 A1 | 5/2009 | Allen et al. | | |

* cited by examiner

| WRD 402 | PHO 404 | GUI Item Type 406 | GRPH 408 | ALT 410 | OBJ 412 |

SEARCH-BASED DYNAMIC VOICE ACTIVATION

CROSS-REFERENCE TO RELATED APPLICATION

This application is a continuation of U.S. application Ser. No. 12/126,077, filed May 23, 2008, which claims the benefit of U.S. Provisional Application Ser. No. 61/018,112, filed Dec. 31, 2007, the contents of each are incorporated by reference.

FIELD OF THE INVENTION

The present invention relates to a method and system for voice navigation. The present invention further relates to voice navigation as relating to graphical user interface items.

Introduction

Voice recognition software has historically performed less than ideally. Most software programs that perform voice recognition based navigation have previously done so by constructing a voice dialogue application statically for each view of a graphical user interface (GUI). To do this, for each view of a GUI, a dialogue application has to anticipate every grammar and vocabulary choice of the user. This process may significantly impede browsing and navigation.

Web content providers may currently use VoiceXML® for voice navigation or browsing by voice enabling web pages. VoiceXML® uses a static voice navigation system, which does not allow for much flexibility. VoiceXML® coverage may not extend to the entire webpage.

SUMMARY OF THE INVENTION

A method, apparatus, and electronic device for voice navigation are disclosed. A voice input mechanism may receive a verbal input from a user to a voice user interface program invisible to the user. A processor may identify in a graphical user interface (GUI) a set of GUI items. The processor may convert the set of GUI items to a set of voice searchable indices. The processor may correlate a matching GUI item of the set of GUI items to a phonemic representation of the verbal input.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, apparatus, and electronic device for voice navigation are disclosed. A voice input mechanism may receive a verbal input from a user to a voice user interface program invisible to the user. A processor may identify in a graphical user interface (GUI) a set of GUI items. The processor may convert the set of GUI items to a set of voice searchable indices. The processor may correlate a matching GUI item of the set of GUI items to a phonemic representation of the verbal input.

Figure 1:
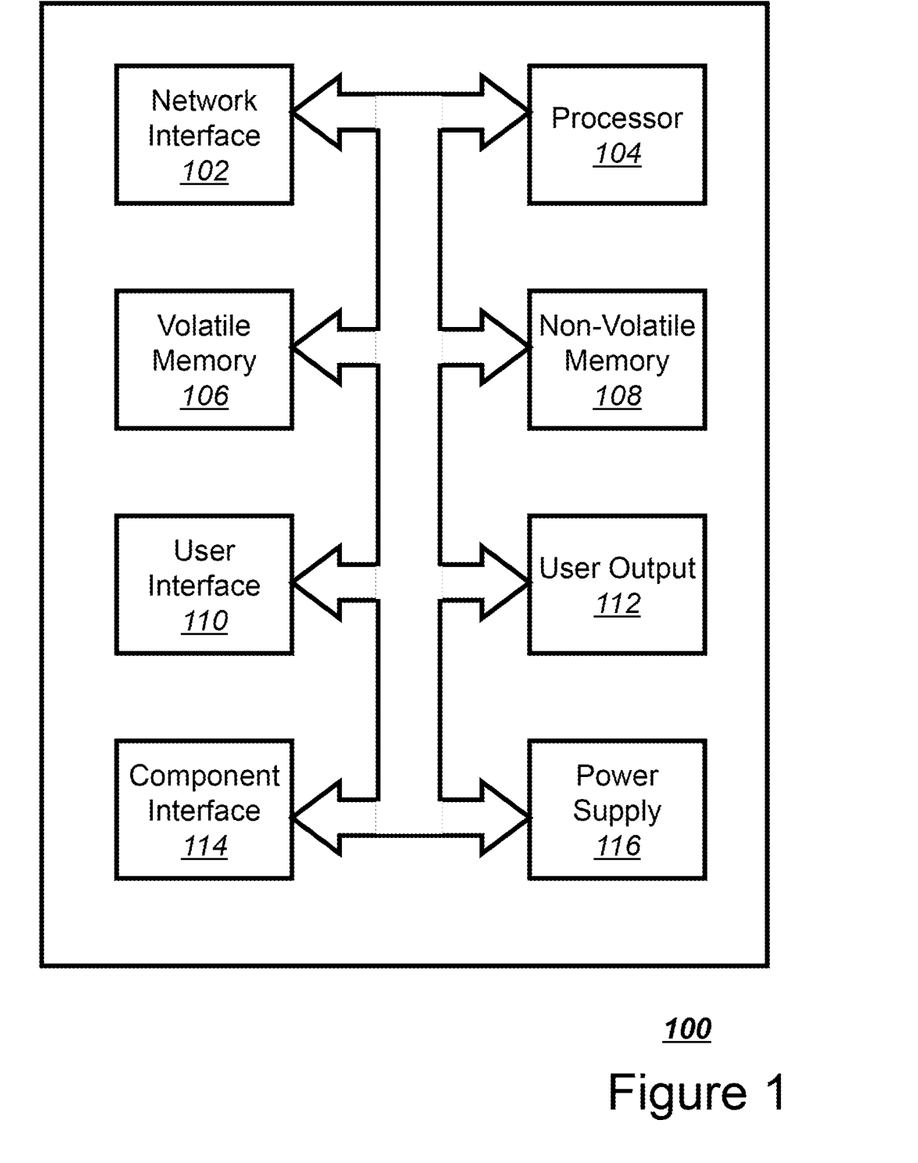
FIG. 1 illustrates in a block diagram one embodiment of a computing device that may be used to implement the communication protocol management method.

FIG. 1 illustrates in a block diagram one embodiment of a computing device 100 that may be used to implement a voice navigation method. Any computing device, such as a desktop computer, handheld device, or a server, may implement the voice navigation method. The computing device 100 may access the information or data stored in a network. The computing device 100 may support one or more applications for performing various communications with the network. The computing device 100 may implement any operating system, such as Windows or UNIX, for example. Client and server software may be written in any programming language, such as C, C++, Java or Visual Basic, for example. The computing device 100 may be a mobile phone, a laptop, a personal digital assistant (PDA), or other portable device. For some embodiments of the present invention, the computing device 100 may be a WiFi capable device, which may be used to access the network for data or by voice using voice over internet protocol (VoIP). The computing device 100 may include a network interface 102, such as a transceiver, to send and receive data over the network.

The computing device 100 may include a controller or processor 104 that executes stored programs. The controller or processor 104 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The computing device 100 may also include a volatile memory 106 and a non-volatile memory 108 to be used by the processor 104. The volatile 106 and nonvolatile data storage 108 may include one or more electrical, magnetic or optical memories such as a random access memory (RAM), cache, hard drive, or other memory device. The memory may have a cache to speed access to specific data. The memory may also be connected to a compact disc-read only memory (CD-ROM), digital video disc-read only memory (DVD-ROM, DVD read write input, tape drive or other removable memory device that allows media content to be directly uploaded into the system.

The computing device 100 may include a user input interface 110 that may comprise elements such as a keypad, display, touch screen, or any other device that accepts input. The computing device 100 may also include a user output device that may comprise a display screen and an audio interface 112 that may comprise elements such as a microphone, earphone, and speaker. The computing device 100 also may include a component interface 114 to which additional elements may be attached, for example, a universal serial bus (USB) interface or an audio-video capture mechanism. Finally, the computing device 100 may include a power supply 116.

Client software and databases may be accessed by the controller or processor 104 from the memory, and may include, for example, database applications, word processing applications, video processing applications as well as components that embody the decision support functionality of the present invention. The user access data may be stored in either a database accessible through a database interface or in the memory. The computing device 100 may implement any operating system, such as Windows or UNIX, for example. Client and server software may be written in any programming language, such as C, C++, Java or Visual Basic, for example.

Figure 2:
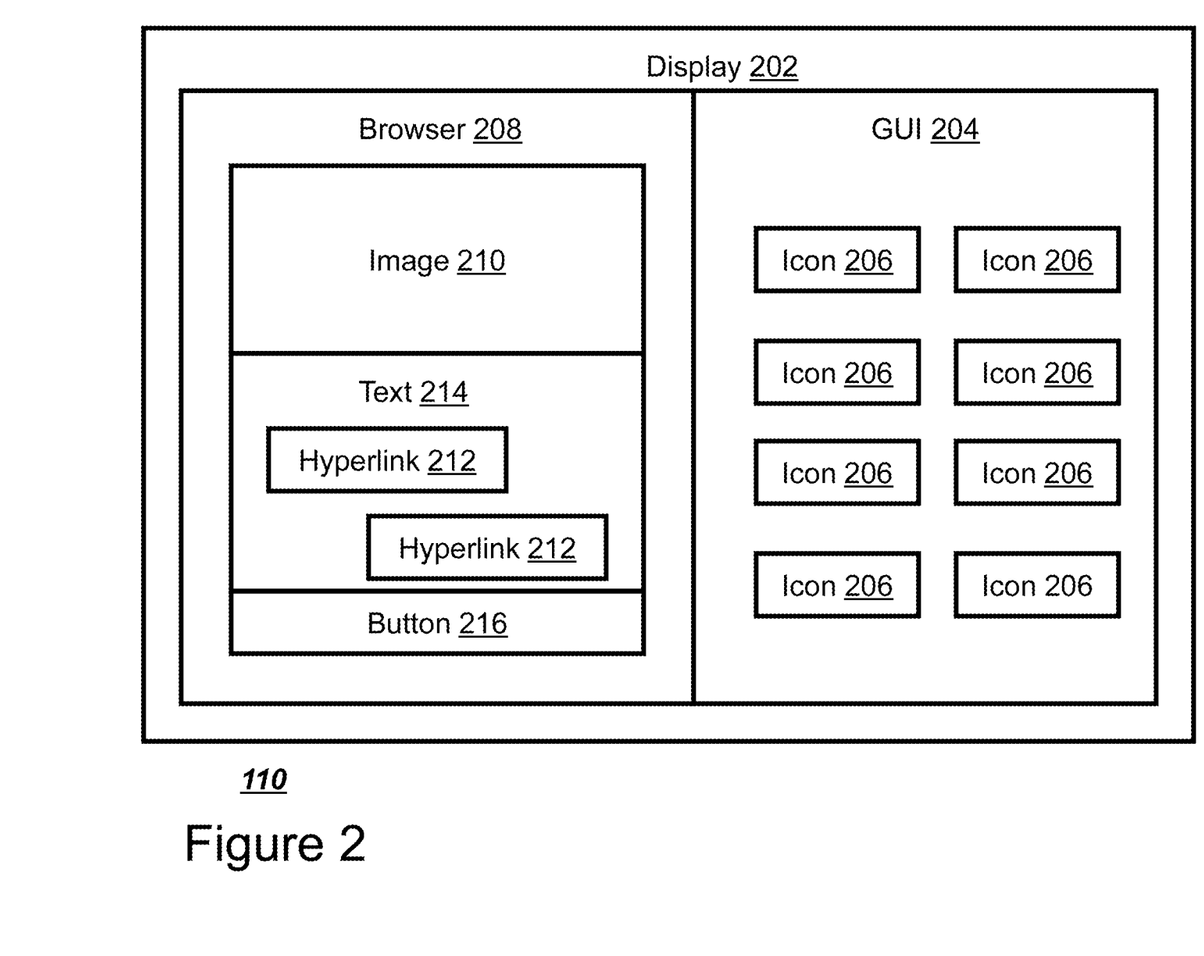
FIG. 2 illustrates in a block diagram one embodiment of a graphical user interface.

A graphical user interface (GUI) may allow the user to interact with a series of data objects stored in a computer or on the internet. A data object may be a file, webpage, an application, or other coherent set of computer data. The term "computer data" may refer to data found on the internet. The GUI may represent each data object with a GUI item, such as a hyperlink, soft-button, image, icon, or other representation of the data object. The GUI need not distinguish between GUI-viewed data objects from a computer or the internet. FIG. 2 illustrates in a block diagram one embodiment of a GUI. The user interface 110 of the computing device 100 may be a display 202. The computing device 100 may interact with the user using a graphical user interface 204. A standard GUI 204 may present to a user one or more GUI items, such as icons 206 representing one or more data file objects on the display 202. A GUI item may be any representation shown in a GUI that acts as an input signal to open some type of data object. For a computing device 100 connected to a network, such as the internet, the GUI may be a browser 208 to present a webpage to a user. The webpage may have images 210 that link to other web pages. The web pages may have an icon or button 212 to activate a web application. Further, the webpage may have hyperlinks 214 linking to other web pages buried within the set of text 216 presented on the webpage. For items such as these browsers 208, where a number of new hyperlinks 214 are presented each time the browser is reloaded, voice recognition software that requires the construction of grammars to reflect the various ways user pronounce the hyperlinks may be impractical. GUIs with a large number of GUI items may be impractical for prompted voice navigation.

Figure 3:
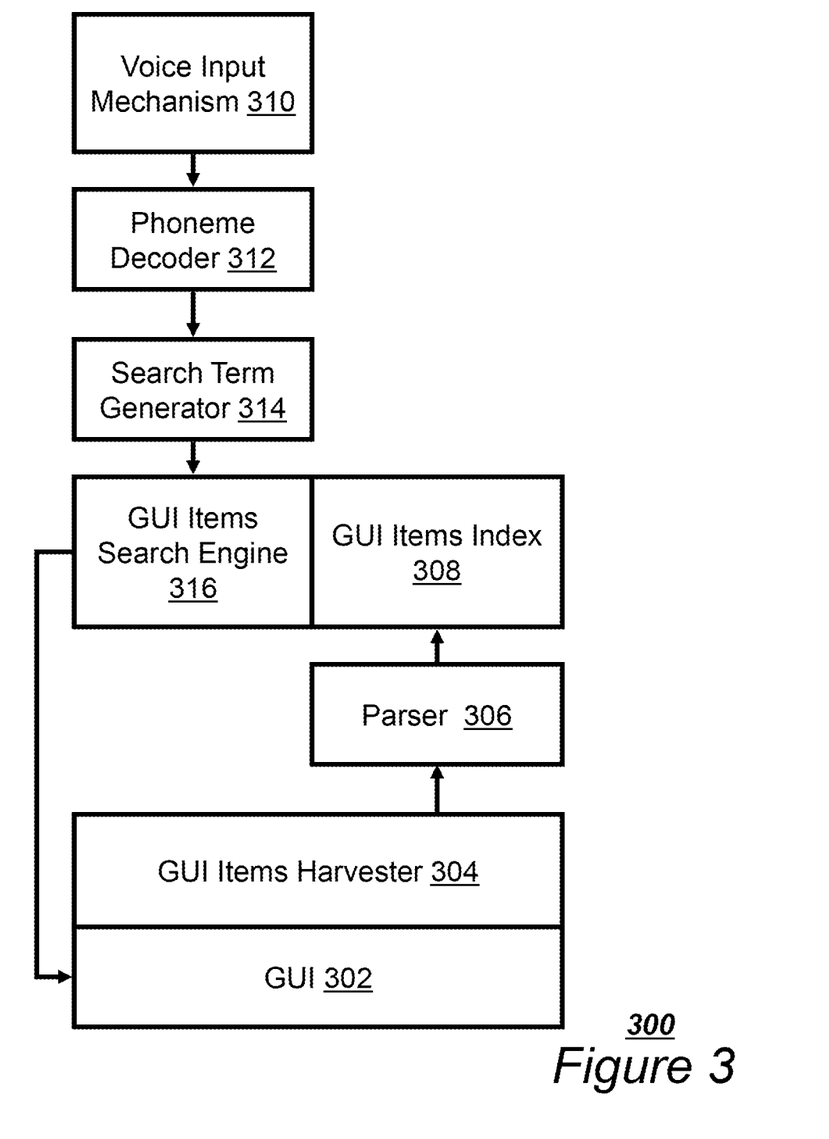
FIG. 3 illustrates in a block diagram one embodiment of verbal user interface software application.

The GUI items from a view of a GUI may be harvested and dynamically translated into voice search indices. A voice user interface (VUI) may use the search indices to form a view-specific searchable database. The view of the display 202 may be voice-enabled just in time. FIG. 3 illustrates in a block diagram one embodiment of an invisible verbal user interface program 300. The display 202 may show a GUI 302 to the user. A GUI items harvester module 304 may search the GUI 302 for GUI items. GUI items may include hyperlinks 214, images 210, application icons 206, and other graphic images that lead to a data object. A data object may be a file, webpage, an application, or other coherent set of computer data. The GUI items harvester module 304 may collect all the GUI items in the GUI 302, as well as any contextual data associated with the GUI items. A parser 306, such as a text normalization module or a grapheme to phoneme module, may convert each GUI item in the GUI 302 into a searchable index in the form of a linguistic document. The parser 306 may take into account linguistic surface form, surrounding texts, hyperlinked webpage titles, metadata, and other data associated with the GUI item. A database of GUI item indices 308 may organize the linguistic documents into a searchable database to facilitate searching.

The VUI may convert a verbal input into a phoneme lattice to match against the searchable indices from the view-specific searchable database. A voice input mechanism 310 may receive a verbal input from a user. A phoneme decoder 312, or other voice recognition technology, may convert the verbal input into a phoneme lattice. A search term generator 314 may extract linguistic search terms from the phoneme lattice, such as a phoneme, syllable, or word string. A GUI items search engine 316 may take the linguistic search term and search the GUI items index 308. The GUI items search engine 316 may select a GUI item and may perform a navigation action associated with the matching GUI item to the GUI 302.

Figure 4:
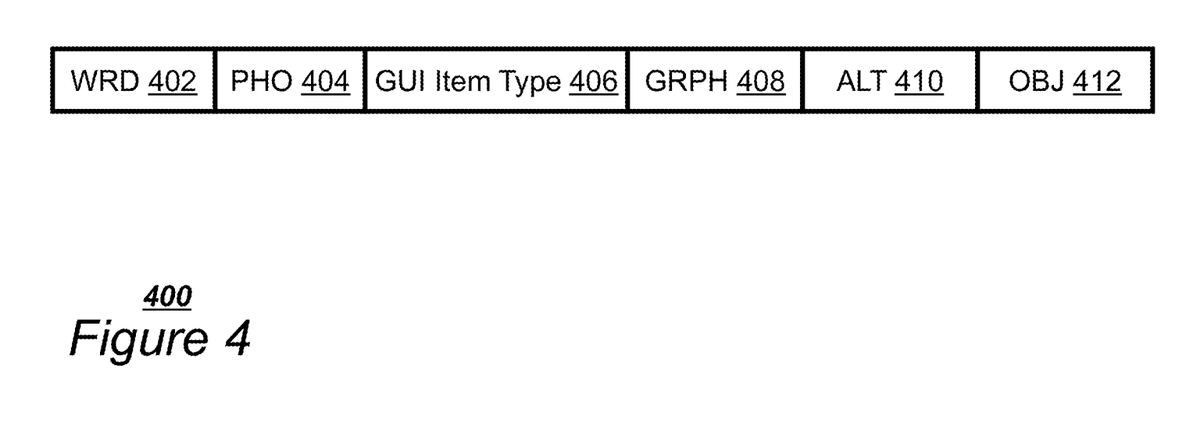
FIG. 4 illustrates in a block diagram one embodiment of voice searchable indices.

FIG. 4 illustrates in a block diagram one embodiment of voice searchable indices 400. The voice searchable indices 400 may be initially sorted by number of words (WRD) 402. The voice searchable indices 400 may be further sorted by phonemes (PHO) 404, the phonemes arranged in spoken order. The voice searchable indices 400 may include a GUI item type 406, such as image, hyperlink, application icon, or other GUI item type. The voice searchable indices 400 may also include an associated grapheme or commonly used name of the GUI item (GRPH) 408, such as picture, button, arrow, or other names. The voice searchable indices 400 may have a set of alternate linguistic labels (ALT) 410 to identify the GUI item, especially if the GUI item is an image or other GUI item that may be thought to have multiple label names by the user. The voice searchable indices 400 may include a link to the computer object (OBJ) 412 represented by the GUI item.

Figure 5:
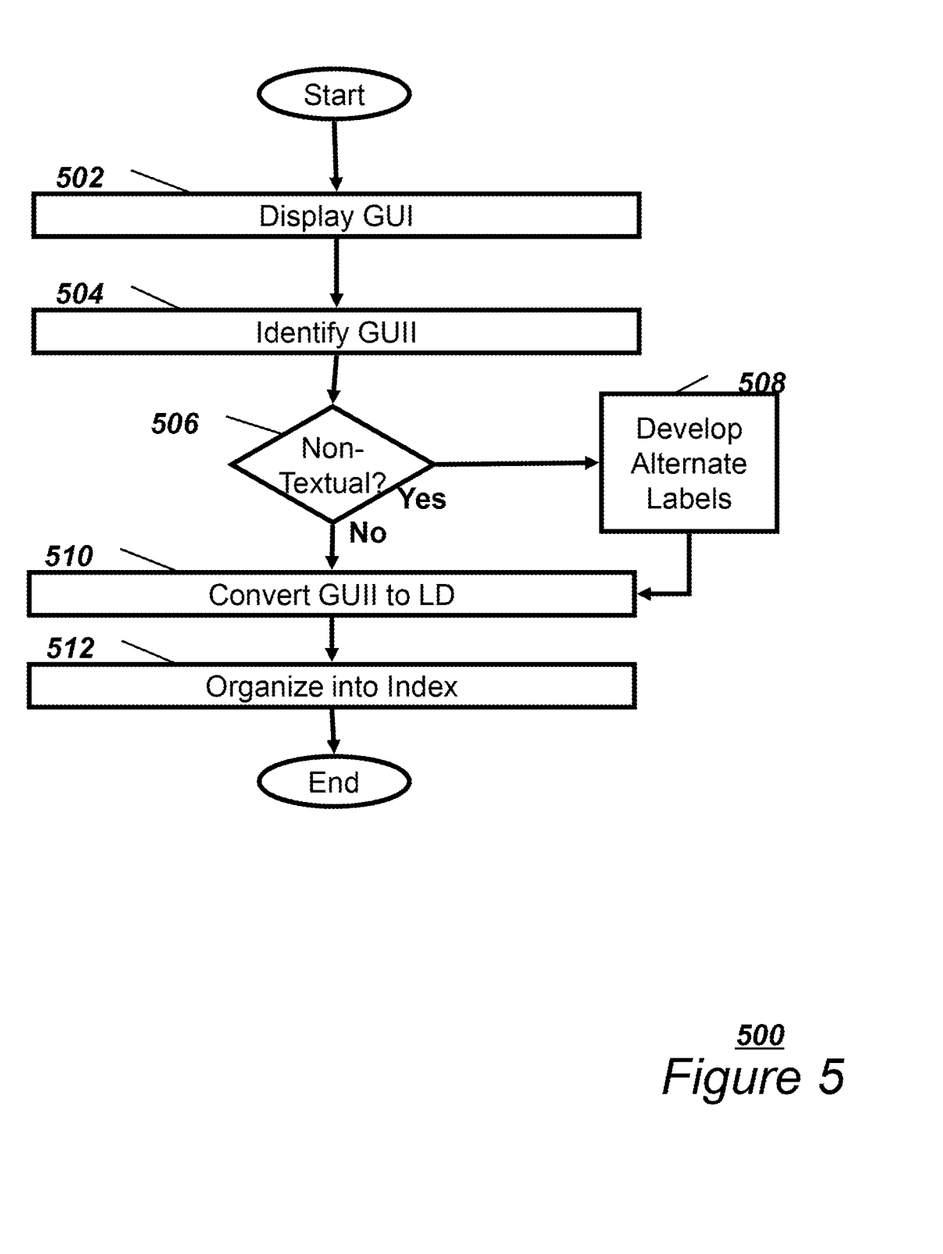
FIG. 5 illustrates in a flowchart one embodiment of a method for developing voice searchable indices.

The VUI 300 may create a just-in-time, voice-enabled searchable database from a view of the GUI. FIG. 5 illustrates in a flowchart one embodiment of a method 500 for developing a voice searchable indices 400. The computing device 100 may display a GUI to the user (Block 502). The computing device 100 may identify a GUI item (GUII) of the GUI (Block 504). If the GUII is a non-textual GUII (Block 506), such as an image or unlabeled icon, the computing device 100 may develop alternate linguistic labels for the GUII (Block 508). The computing device 100 may create textual description based on metadata for a GUII, commonly depicted names, surrounding text, labels, grapheme, and other data. The computing device 100 may convert the GUII to a linguistic document (LD) (Block 510). The computing device 100 may organize the LDs into a searchable database of GUII indices (Block 512).

Figure 6:
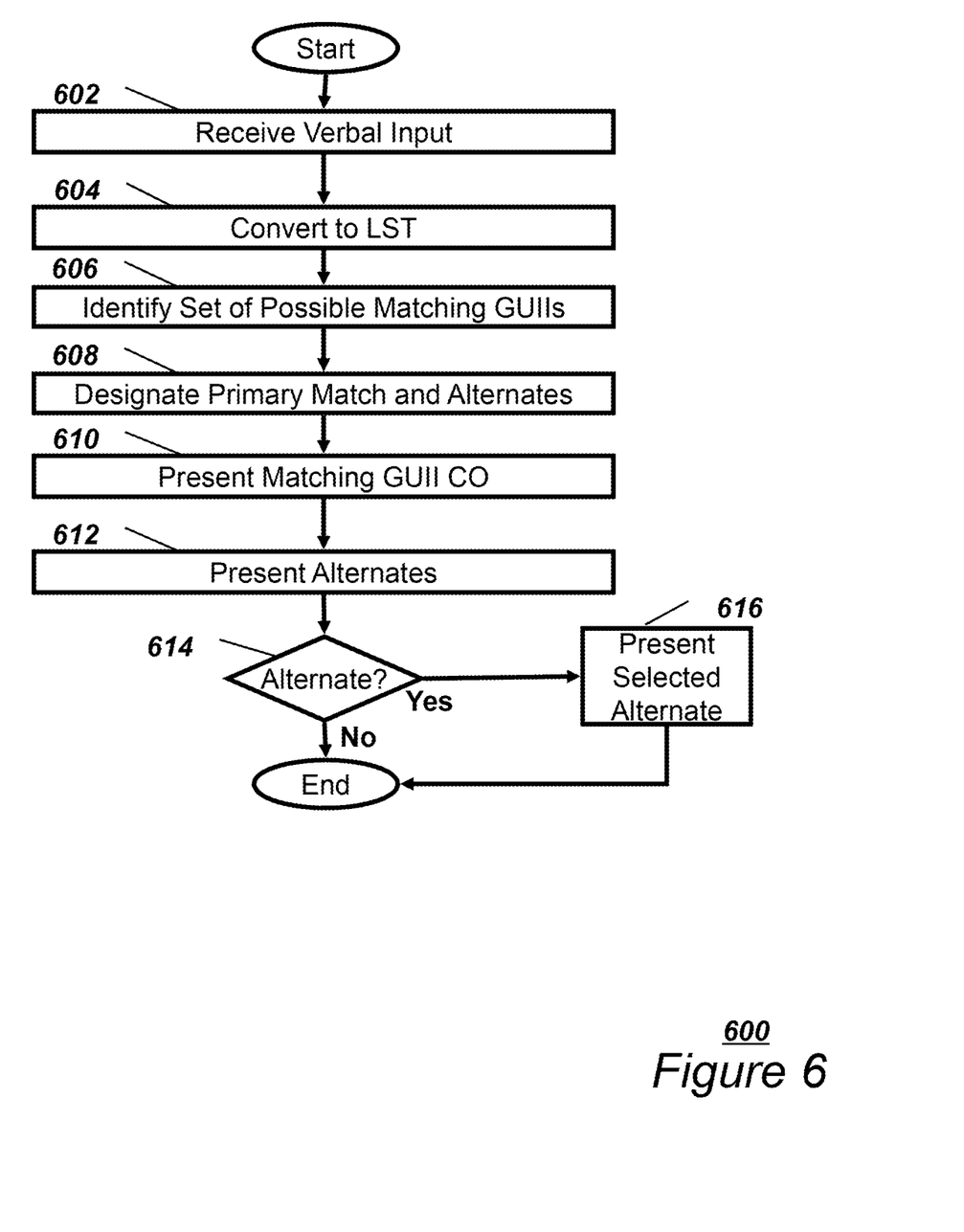
FIG. 6 illustrates in a flowchart one embodiment of a method for invisible voice navigation.

Upon receiving a verbal input from the user, the VUI 300 may use the GUI item index 400 to select the GUI item best matched with the verbal input to the user. The VUI 300 may also select and present to the user a set of alternate GUI items that are next best matched to the verbal input. FIG. 6 illustrates in a flowchart one embodiment of a method 600 for invisible voice navigation. The VUI 300 may receive a verbal input from the user (Block 602). The VUI 300 may identify a set of possible matching GUIs (Block 604). The VUI 300 may designate a primary matching GUII, or closest verbal match, and a set of one or more alternate GUIs from the set of possible matching GUIs (Block 606). The VUI 300 may identify a primary matching GUII and one or more alternate GUIs (Block 608). The VUI 300 may present a computer object (CO) associated with the primary matching GUII (Block 610). The VUI 300 may present the alternate GUIs to the user (Block 612). Alternatively, the VUI 300 may present an approximation of the computer objects associated with the alternate GUIs. If the user selects one of the alternate GUIs (Block 614), the VUI 300 may present the computer object associated with the selected alternate GUII (Block 616).

To account for the verbal tics of a user, the VUI 300 may keep a history of various users in order to determine which GUII to present as the primary matching GUII and which GUIs to present as the alternates during repeated uses of the VUI 300. The VUI 300 may track if a specific verbal input is repeatedly used when referring to a specific GUII of a specific GUI. The VUI 300 may then present that GUII as the primary matching GUII. Further, for an initial use of a GUI by a user, the VUI 300 may use the histories of other users to determine a primary matching GUII when multiple GUIs have a similar linguistic document.

Figure 7:
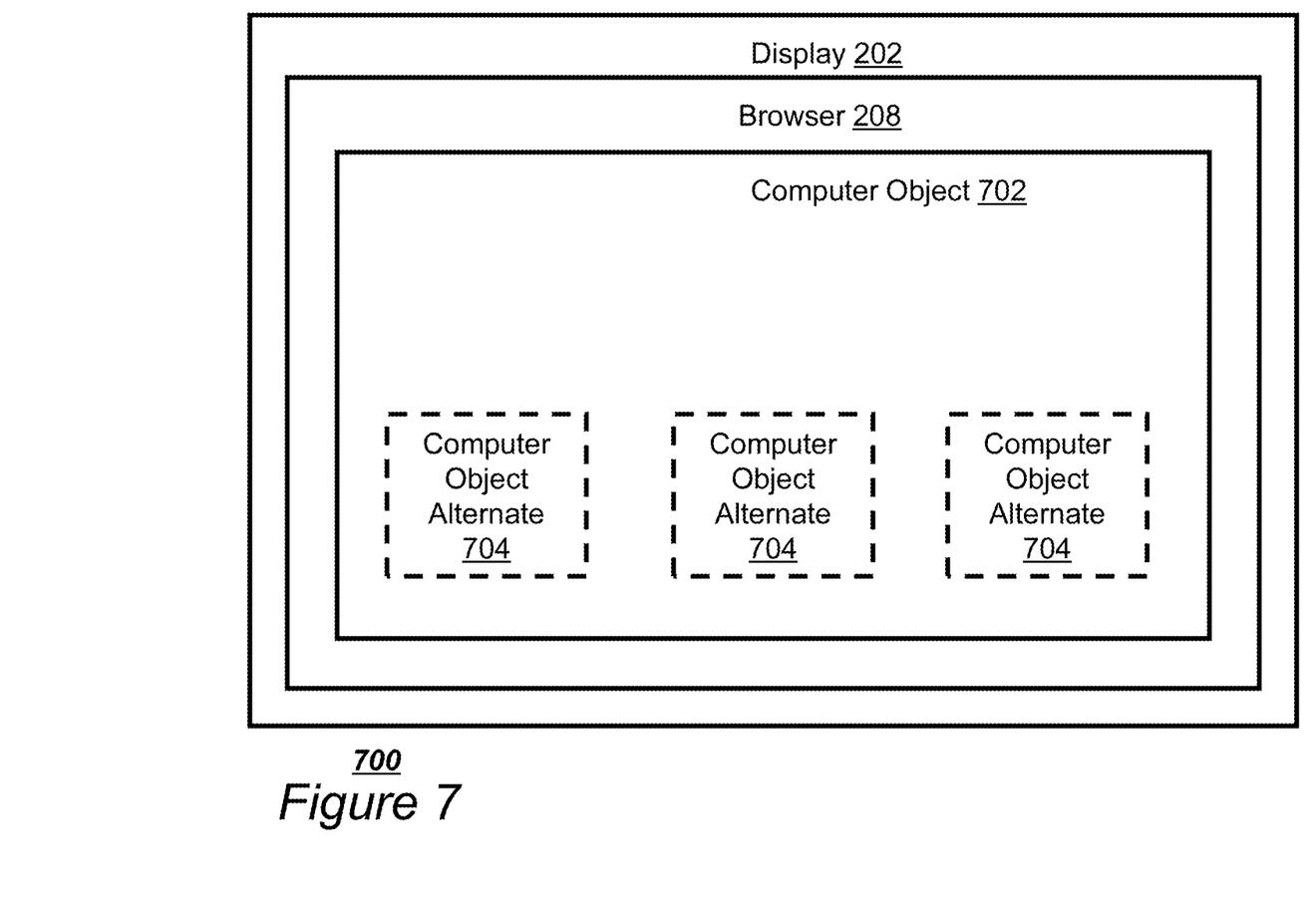
FIG. 7 may illustrate in a block diagram one embodiment of a graphical voice navigation response.

The VUI 300 may briefly present the alternate GUI items to the user in a pop-up window. The pop-up window may be removed if no item is selected after a set period of time. If one of the alternate GUI items is selected, the VUI 300 may execute the navigation action associated with the selected GUI item and override the initially presented view. FIG. 7 may illustrate in a block diagram one embodiment of a graphical voice navigation response 702 with alternate computer objects. The browser 208 may present a computer object 702 associated with the matching GUII. The browser 208 may also present approximate representations of the computer objects 704 associated with the next closest matches to the LST. If the user does not select one of the alternates after a set period of time, the alternate computer objects may be removed from the browser 208.

Embodiments may also be practiced in distributed computing environments where tasks are performed by local and remote processing devices that are linked (either by hardwired links, wireless links, or by a combination thereof through a communications network.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

The invention claimed is:

1. A computer-implemented method for voice-enabling a graphical user interface that is not voice-enabled by default, the method comprising:

providing, for display, a graphical user interface that is not voice-enabled by default and that includes a user-selectable control;

after the graphical user interface that is not voice-enabled by default is provided for display and before receiving input from a user through the graphical user interface:

selecting a first representative term for the user-selectable control based on one of (i) text that surrounds the first user-selectable control on the graphical user interface, (ii) hyperlinked webpage titles associated with the graphical user interface, or (iii) metadata associated with the graphical user interface; and selecting a second representative term for the user-selectable control based on another of (i) the text that surrounds the first user-selectable control on the graphical user interface, (ii) the hyperlinked webpage titles associated with the graphical user interface, or (iii) the metadata associated with the graphical user interface, wherein the basis for the selection of the first representative term is different than the basis for the selection of the second representative term;

generating a first phonetic representation of the first representative term for the user-selectable control;

generating a second phonetic representation of the second representative term for the user-selectable control;

storing, in a voice searchable index that is populated after the graphical user interface is displayed, the first phonetic representation of the first representative term and the second phonetic representation of the second representative term in association with data referencing the user-selectable control;

receiving a voice input from the user after the graphical user interface that is not voice-enabled by default is provided for output;

generating a phonetic representation of the voice input;

determining that the phonetic representation of the voice input corresponds to the first phonetic representation of the first representative term and does not correspond to the second phonetic representation of the second representative term;

based on determining that the phonetic representation of the voice input corresponds to the first phonetic representation of the first representative term that is stored in the voice searchable index, determining that the user has selected the user-selectable control; and based on determining that the phonetic representation of the voice input corresponds to the first phonetic representation of the first representative term and does not correspond to the second phonetic representation of the second representative term, associating the first phonetic representation of the first representative term with the user-selectable control in the voice searchable index and deleting the second phonetic representation of the second representative term stored in the voice searchable index.

2. The method of claim 1, comprising:
before deleting the second phonetic representation, providing, for display in a pop-up window for a set period of time, the second representative term.

3. The method of claim 1, wherein the voice searchable index is specific to the user.

4. The method of claim 1, wherein the voice searchable index is not created until the graphical user interface is displayed.

5. A system comprising:
one or more computers and one or more storage devices storing instructions that are operable, when executed by the one or more computers, to cause the one or more computers to perform operations for voice-enabling a graphical user interface that is not voice-enabled by default, the operations comprising:
providing, for display, a graphical user interface that is not voice-enabled by default and that includes a user-selectable control;
after the graphical user interface that is not voice-enabled by default is provided for display and before receiving input from a user through the graphical user interface:
selecting a first representative term for the user-selectable control based on one of (i) text that surrounds the first user-selectable control on the graphical user interface, (ii) hyperlinked webpage titles associated with the graphical user interface, or (iii) metadata associated with the graphical user interface; and selecting a second representative term for the user-selectable control based on another of (i) the text that surrounds the first user-selectable control on the graphical user interface, (ii) the hyperlinked webpage titles associated with the graphical user interface, or (iii) the metadata associated with the graphical user interface, wherein the basis for the selection of the first representative term is different than the basis for the selection of the second representative term;

generating a first phonetic representation of the first representative term for the user-selectable control;

generating a second phonetic representation of the second representative term for the user-selectable control;

storing, in a voice searchable index that is populated after the graphical user interface is displayed, the first phonetic representation of the first representative term and the second phonetic representation of the second representative term in association with data referencing the user-selectable control;

receiving a voice input from the user after the graphical user interface that is not voice-enabled by default is provided for output;

generating a phonetic representation of the voice input;

determining that the phonetic representation of the voice input corresponds to the first phonetic representation of the first representative term and does not correspond to the second phonetic representation of the second representative term;

based on determining that the phonetic representation of the voice input corresponds to the first phonetic representation of the first representative term that is stored in the voice searchable index, determining that the user has selected the user-selectable control; and based on determining that the phonetic representation of the voice input corresponds to the first phonetic representation of the first representative term and does not correspond to the second phonetic representation of the second representative term, associating the first phonetic representation of the first representative term with the user-selectable control in the voice searchable index and deleting the second phonetic representation of the second representative term stored in the voice searchable index.

6. The system of claim 5, wherein the operations comprise:
before deleting the second phonetic representation, providing, for display in a pop-up window for a set period of time, the second representative term.

7. The system of claim 5, wherein the voice searchable index is specific to the user.

8. The system of claim 5, wherein the voice searchable index is not created until the graphical user interface is displayed.

9. A non-transitory computer-readable medium storing software comprising instructions executable by one or more computers which, upon such execution, cause the one or more computers to perform operations for voice-enabling a graphical user interface that is not voice-enabled by default, the operations comprising:

providing, for display, a graphical user interface that is not voice-enabled by default and that includes a user-selectable control;

after the graphical user interface that is not voice-enabled by default is provided for display and before receiving input from a user through the graphical user interface:

selecting a first representative term for the user-selectable control based on one of (i) text that surrounds the first user-selectable control on the graphical user interface, (ii) hyperlinked webpage titles associated with the graphical user interface, or (iii) metadata associated with the graphical user interface; and selecting a second representative term for the user-selectable control based on another of (i) the text that surrounds the first user-selectable control on the graphical user interface, (ii) the hyperlinked webpage titles associated with the graphical user interface, or (iii) the metadata associated with the graphical user interface, wherein the basis for the selection of the first representative term is different than the basis for the selection of the second representative term;

generating a first phonetic representation of the first representative term for the user-selectable control;

generating a second phonetic representation of the second representative term for the user-selectable control;

storing, in a voice searchable index that is populated after the graphical user interface is displayed, the first phonetic representation of the first representative term and the second phonetic representation of the second representative term in association with data referencing the user-selectable control;

receiving a voice input from the user after the graphical user interface that is not voice-enabled by default is provided for output;

generating a phonetic representation of the voice input;

determining that the phonetic representation of the voice input corresponds to the first phonetic representation of the first representative term and does not correspond to the second phonetic representation of the second representative term;

based on determining that the phonetic representation of the voice input corresponds to the first phonetic representation of the first representative term that is stored in the voice searchable index, determining that the user has selected the user-selectable control; and based on determining that the phonetic representation of the voice input corresponds to the first phonetic representation of the first representative term and does not correspond to the second phonetic representation of the second representative term, associating the first phonetic representation of the first representative term with the user-selectable control in the voice searchable index and deleting the second phonetic representation of the second representative term stored in the voice searchable index.

10. The medium of claim 9, wherein the operations comprise:

before deleting the second phonetic representation, providing, for display in a pop-up window for a set period of time, the second representative term.

11. The medium of claim 9, wherein the voice searchable index is specific to the user.

12. The method of claim 1, comprising:

determining that at least a predetermined period of time has elapsed since providing the graphical interface for display and without receiving an additional voice input with a phonetic representation that corresponds to the second phonetic representation of the second representative term, wherein deleting the second phonetic representation of the second representative term stored in the voice searchable index is further based on determining that at least the predetermined period of time has elapsed since providing the graphical interface for display and without receiving an additional voice input with a phonetic representation that corresponds to the second phonetic representation of the second representative term.

13. The system of claim 5, wherein the operations comprise:

determining that at least a predetermined period of time has elapsed since providing the graphical interface for display and without receiving an additional voice input with a phonetic representation that corresponds to the second phonetic representation of the second representative term, wherein deleting the second phonetic representation of the second representative term stored in the voice searchable index is further based on determining that at least the predetermined period of time has elapsed since providing the graphical interface for display and without receiving an additional voice input with a phonetic representation that corresponds to the second phonetic representation of the second representative term.

14. The medium of claim 9, wherein the voice searchable index is not created until the graphical user interface is displayed.

15. The medium of claim 9, wherein the operations comprise:

determining that at least a predetermined period of time has elapsed since providing the graphical interface for display and without receiving an additional voice input with a phonetic representation that corresponds to the second phonetic representation of the second representative term, wherein deleting the second phonetic representation of the second representative term stored in the voice searchable index is further based on determining that at least the predetermined period of time has elapsed since providing the graphical interface for display and without receiving an additional voice input with a phonetic representation that corresponds to the second phonetic representation of the second representative term.

* * * * *